J. G. SMITH.
Agricultural Boilers.

No. 158,322. Patented Dec. 29, 1874.

WITNESSES
Franci L. Durand
C. L. Evert

INVENTOR
Joseph G. Smith
per Alexander F Mason
Attorneys

UNITED STATES PATENT OFFICE.

JOSEPH G. SMITH, OF FREEPORT, ILLINOIS.

IMPROVEMENT IN AGRICULTURAL BOILERS.

Specification forming part of Letters Patent No. 158,322, dated December 29, 1874; application filed August 4, 1874.

*To all whom it may concern:*

Be it known that I, JOSEPH G. SMITH, of the city of Freeport, in the county of Stephenson and in the State of Illinois, have invented certain new and useful Improvements in Agricultural Boilers; and do hereby declare that the following is a full, clear, and exact description thereof, reference being had to the accompanying drawings, and to the letters of reference marked thereon, making a part of this specification.

The nature of my invention consists in the construction of an agricultural boiler, or a boiler for cooking vegetables and heating water, the peculiarities of which will be hereinafter set forth.

Figure 1:
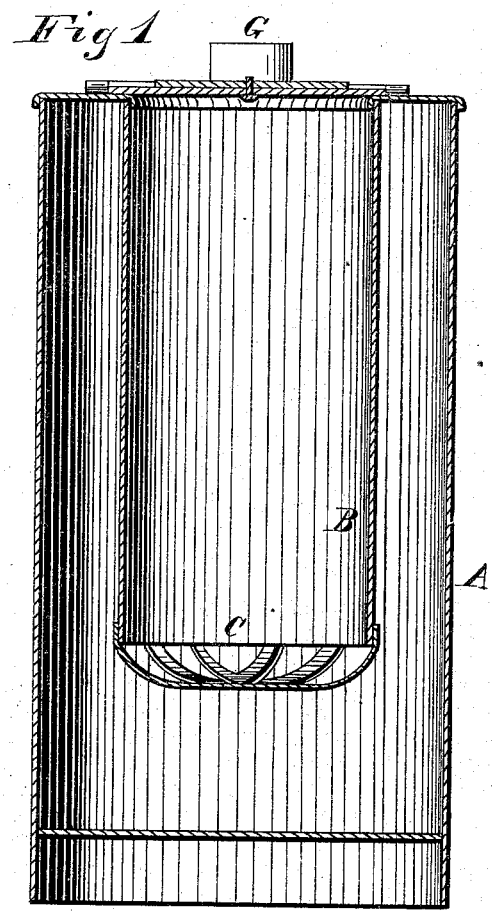
Figure 2:
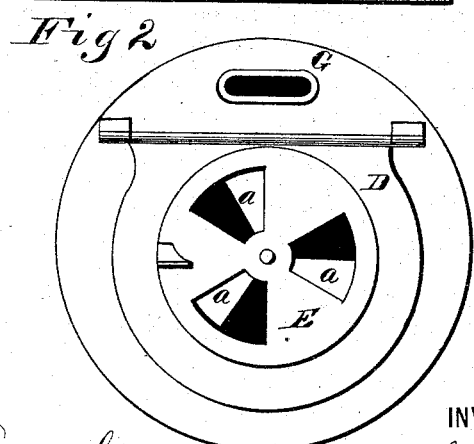

In the annexed drawings, Figure 1 is a vertical section, and Fig. 2 a plan or top view, of my boiler.

In the figures, A represents a cylindrical case, which is closed at bottom, but which has an outlet, G, which answers as a smoke stack or pipe. Depending from the top of this case A is an inner cylinder, B. This cylinder is provided at its lower end with a grated fire-pot, C, and at its upper end with a hinged door, D, said door being provided with suitable dampers $a$ $a$, for allowing air to the cylinder. An air-space is left all around the inner cylinder, between it and the outer case.

When fire is placed in the fire-pot C the products of combustion pass up between the two cylinders and out of the smoke-pipe G.

By the use of an outer cylinder I am enabled to keep fire with more ease and certainty in the inner one, and can heat water faster than I can with a single one.

What I claim as new is—

The combination of the case A, with closed bottom, outlet G, and hinged lid D, with damper E $a$ at the top, and the inner cylinder B, connected to and depending from the top of the cylinder A, and provided with the grate-bottom C, all substantially as set forth.

In testimony that I claim the foregoing I have hereunto set my hand this 13th day of July, 1874.

JOSEPH G. SMITH.

Witnesses:
    GEO. WOLF,
    HENRY OHL.